G. A. MADISON.
METHOD OF DISPENSING TOOTH PASTE.
APPLICATION FILED DEC. 3, 1909.
987,808.
Patented Mar. 28, 1911.
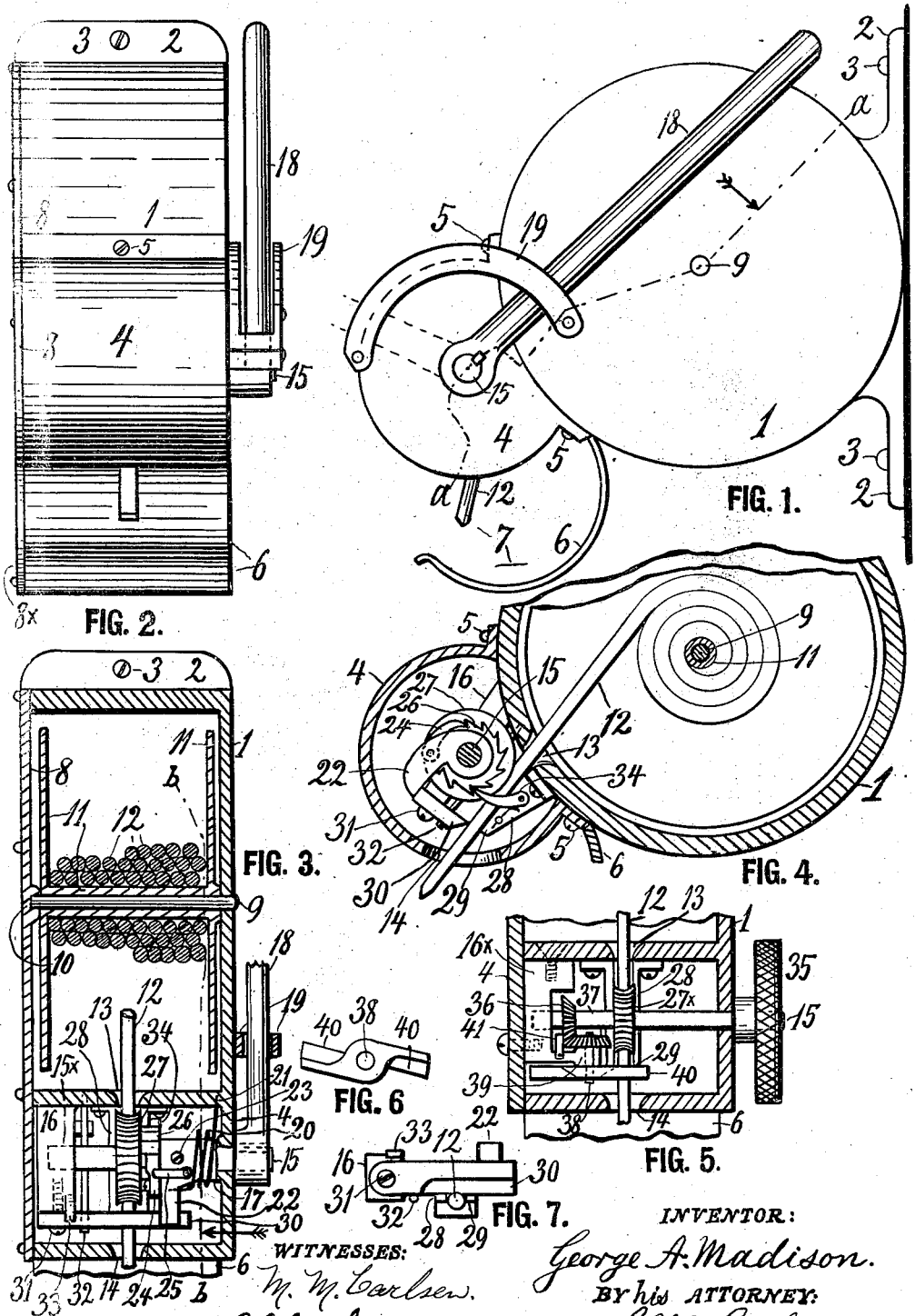
INVENTOR:
George A. Madison.
BY his ATTORNEY:
A. M. Carlsen.
WITNESSES:
M. M. Carlsen.
A. E. Carlsen.

UNITED STATES PATENT OFFICE.

GEORGE A. MADISON, OF ST. PAUL, MINNESOTA.

METHOD OF DISPENSING TOOTH-PASTE.

987,808.

Specification of Letters Patent. Patented Mar. 28, 1911.

Application filed December 3, 1909. Serial No. 531,207.

*To all whom it may concern:*

Be it known that I, GEORGE A. MADISON, a citizen of the United States, residing at St. Paul, in the county of Ramsey and State of Minnesota, have invented a new and useful Method of Dispensing Tooth-Paste, of which the following is a specification.

My invention relates to means and methods for distributing or dispensing in small portions tooth pastes and other similar substances; and the main object is to enable several persons to obtain, each of them independently and separately a portion of such paste from a common source in a convenient and sanitary manner.

The invention is especially adapted for dispensing tooth paste in the toilet room of hotels, depots and railway cars.

The invention involves a method consisting in filling tooth paste into a tube of thin material, winding the tube on a spool and then by an easily operated mechanism unroll the tube gradually from the spool and cutting it into the desired lengths or pieces, from which the operator then squeezes the paste onto the tooth brush. The devices by which this may be carried out may be of various forms, as will be partly understood from the structure and a modification thereof illustrated in the accompanying drawing, in which,—

Figure 1 is a side view of my tooth paste dispensing device in a very serviceable form. Fig. 2 is a front view of the device shown in Fig. 1. Fig. 3 is a section through the casing and spool of the device, about as on the line *a—a* in Fig. 1 but with the hand lever and dispensing mechanism intact. Fig. 4 is a section through the device on the line *b—b* in Fig. 3. Fig. 5 is the lower part of Fig. 3 modified. Fig. 6 is a detail front side view of the tube cutting double blade in Fig. 5. Fig. 7 is a detail front side view of the tube cutting blade in Fig. 3 and some of the adjacent parts.

Referring to the drawing by reference numerals, the frame of the device is composed of a cylindrical casing 1, having at its back lugs 2 securable by screws 3 to any wall or other object, while at the front of the casing is a mechanism chamber 4, which may be secured by screws 5 to the casing or made integral with the latter. Below said chamber 4 is arranged a receiving shelf 6, upon which the pieces of the tube drop as shown at 7 in Fig. 1, as fast as they are cut from the tube.

One end of the cylindrical casing is closed by a removable lid 8, which, as shown in Fig. 3, may extend also over the end of the chamber 4, and, as shown in Fig. 2, it may even extend as a bracing portion 8$^x$ to the receiving shelf 6.

In the center of the integral head of the casing is fixed one end of a shaft 9, whose other end is supported in a cavity 10 in the lid 8. On said shaft is revolubly mounted the spool 11, on which a tube 12 is wound after being made of very thin tin or other suitable material and filled with a tooth paste. The outer end of the tube is passed through an aperture 13 in the casing and thence through an aperture 14 in the mechanism chamber.

For the purpose of gradually unwinding and severing the tube into pieces of about an inch or less in length, I provide in the mechanism chamber the following mechanism, as shown in Figs. 1, 2, 3 and 4. A shaft 15 is journaled with one end at 15$^x$ in the side of a stud 16, and with its other end in a boss 17 of the wall at the opposite end of the chamber, which wall it extends through and is provided with an operating lever 18, which has its stroke limited by the terminals of a slotted arched guide 19 in which it is also guarded against lateral strain. This handle is normally held at the rear terminal of the guide by a spring 20 (see Fig. 3) having one end engaged at 21 with the frame and the other end with a cam 22, which is secured on the shaft by a screw 23. On said cam is pivoted a dog 24, which by a spring 25 is held engaged with a ratchet wheel 26; said ratchet wheel and a tube feeding wheel 27 are secured together and are revoluble on the shaft. The feed wheel has a peripheric groove with roughened surface as shown, so as to take sufficient hold of the upper side of the paste tube, and to insure such hold the lower side of the tube slides on a grooved arm 28, whose free end forms a cutting edge 29, with which coacts a cutter blade 30. (See also Fig. 7). Said blade is pivoted at 31 to the end of the stud or frame arm 16, and is actuated downward by the cam arm 22, and when the lever is returned to normal position the cutter blade is raised by a spring arm 32 until it is above the tube 12 and stops under a lug 33 on the arm 16.

In Fig. 4 is shown how a spring-pressed dog 34 may be applied to the ratchet wheel to guard against reverse turning of it.

From the above description it will be understood that in the operation of the device, the tube being filled with paste and put on the spool or reel 11 and in position as explained, the lever 18 is simply swung forward to its limit, this will cause the cam 22 to swing the blade 30 downward and cut off the tube, and while the lever is returned to normal position the dog 24 acts on the ratchet wheel, turning it and the feed wheel, so that the latter feeds forward another three-fourths of an inch or any other predetermined length of the tube, which length will be severed from the tube and drop upon the shelf 6 at the next forward operation of the lever, and so on each time paste is wanted. It will be observed that during the cutting operation of the tube, the dog 24 plays over the teeth of the ratchet wheel.

In the modification shown in Figs. 5 and 6, the shaft 15 is operated by a hand wheel 35 instead of a hand lever, and the feed wheel 27$^x$ is fixed on the shaft, and the frame arm or stud 16$^x$ is a little different from 16 in Fig. 3. On said shaft is also fixed a beveled gear 36, which turns another beveled gear 37 fixed on a shaft 38, which is journaled in a frame arm 39 and carries secured on its front end a two-blade cutter 40 (best shown in Fig. 6) either of which blades in passing the cutting edge 29 of the fixed member 28 severs the tube. 41 is a spring-arm, or other dog, engaging the teeth of the gear 36 to prevent reverse turning of the hand wheel and the feed wheel. In this modification the length of the pieces cut from the tube may be predetermined partly by the diameter of the feed wheel and partly by diameters of the beveled gears, the latter being in the present drawing illustrated as miter gears, but it is obvious that they represent also bevel gears of any variation of sizes, to indicate which I have termed them beveled gears.

It will finally be understood that as the paste tube is cut the jaws of the cutting device close the severed ends of the tube firmly during the cutting process, so that no paste is wasted, nor can germs or dirt of any kind enter the tube or the paste, as the latter is not exposed to the air before the operator squeezes it from the severed piece of tube for immediate use upon the tooth brush.

Having thus described my invention, what I claim is:

The method of preparing receptacles filled with tooth paste consisting in preparing an elongated body of such paste covered with a thin film of flexible and ductile material and simultaneously severing transversely such body into sections of desired length and squeezing the adjacent ends at the point of severance, thus producing portions of paste entirely surrounded by such film adapted by pressure of the fingers to extrude the contents of the film at a point of severance.

In testimony whereof I affix my signature, in presence of two witnesses.

GEO. A. MADISON.

Witnesses:
A. M. CARLSEN,
LE ROY BROWN.